US006935575B2

(12) United States Patent
Lacchia et al.

(10) Patent No.: US 6,935,575 B2
(45) Date of Patent: Aug. 30, 2005

(54) SPRAYING DEVICE FOR SPRAYING A COATING PRODUCT

(75) Inventors: Adrien Lacchia, Saint Martin le Vinoux (FR); Flavien Dobrowolski, Sinard (FR)

(73) Assignee: Eisenmann France Sarl (FR)

( * ) Notice: Subject to any disclaimer, the term of this patent is extended or adjusted under 35 U.S.C. 154(b) by 0 days.

(21) Appl. No.: 10/296,031

(22) PCT Filed: May 29, 2001

(86) PCT No.: PCT/FR01/01662

§ 371 (c)(1),
(2), (4) Date: Feb. 25, 2003

(87) PCT Pub. No.: WO01/91914

PCT Pub. Date: Dec. 6, 2001

(65) Prior Publication Data

US 2003/0160108 A1 Aug. 28, 2003

(30) Foreign Application Priority Data

May 29, 2000 (FR) .......................................... 00 06862

(51) Int. Cl.[7] .......................... B67D 5/08; A01G 27/00; B05B 1/28; F16K 31/02

(52) U.S. Cl. .......................... 239/71; 239/69; 239/290; 251/129.04

(58) Field of Search .......................... 239/71, 69, 290, 239/67, 296, 690; 700/282, 283; 251/129.04

(56) References Cited

U.S. PATENT DOCUMENTS

| | | | | |
|---|---|---|---|---|
| 5,218,305 A | | 6/1993 | Lunzer | |
| 5,381,962 A | | 1/1995 | Teague | |
| 5,660,334 A | * | 8/1997 | Trusty et al. | 239/691 |
| 6,149,071 A | * | 11/2000 | MacCallumMhor et al. | 239/67 |

FOREIGN PATENT DOCUMENTS

| | | |
|---|---|---|
| GB | 2 068 150 | 8/1981 |
| JP | 08 266955 | 10/1996 |
| WO | WO 00 07741 | 2/0000 |

OTHER PUBLICATIONS

International Search Report PCT/FR01/01662; Oct. 10, 2001.
International Preliminary Examination Report; PCT FR01/01662; May 22, 2002.

* cited by examiner

*Primary Examiner*—David A. Scherbel
*Assistant Examiner*—Darren Gorman
(74) *Attorney, Agent, or Firm*—Cantor Colburn LLP

(57) ABSTRACT

The invention concerns a spraying device including a first assembly provided with a spray nozzle and a second assembly incorporating means for controlling the first assembly. The first assembly is connected to the second assembly through a wireless communication system, for example by radio. The invention is applicable to hand-held powder-coating guns and sprayers associated with a multiaxial machine.

9 Claims, 2 Drawing Sheets

SPRAYING DEVICE FOR SPRAYING A COATING PRODUCT

TECHNICAL FIELD

The present invention relates to a spraying device intended for the spraying of a coating product.

BACKGROUND OF THE INVENTION

Such a spraying device is used for example for the manual painting of any article. It may for example be an electrostatic powder-coating device. Such a spraying device generally comprises a spray gun through which the coating product is propelled, a control module allowing the monitoring and adjustments necessary for propelling this coating product and an assembly of pipes and cables connecting the spray gun to the module. For its part, the spray gun comprises a spray nozzle, a voltage multiplier device making it possible to generate a high voltage and possibly a button for adjusting the flow rate of the propelled product and the shape of the spray cloud. Such a spraying device is revealed for example by U.S. Pat. No. 5,351,903.

Generally, the application spray gun is held by an operator and both are located in a booth through which the articles to be painted file along. The control module is, however, located outside the booth for reasons of standards and soiling.

To paint an article properly, it is necessary for a certain number of parameter, for example the flow rate of paint, the high-voltage or current level, the shaping air streams, etc, to be complied with. Adjustments are envisaged for adapting these parameters to the article and to the paint used.

In the case of hand-held spray guns, the operator has two means of adjusting these parameters. In case, he adjusts the flow rate of paint and the shaping airstreams on an adjustment button on the spray gun. In the document U.S. Pat. No. 5,351,903, this adjustment button takes the form of a trigger associated with a potentiometer. In the second case, he must go outside the booth to perform the required adjustments.

To paint articles, an operator has to wear overalls, a hood, gloves, protective goggles and a mask. This considerably impedes his movements. Moreover, these protective items are more or less covered with paint and on leaving the booth, there is a high risk of soiling.

When the adjustments are made on the button of the spray gun, the operator alters his paint jet visually and it is difficult to reproduce the same parameters for two successive identical articles.

Furthermore, for reasons of handleability of the spray gun and for reasons of reliability thereof, the number of wires of the cable connecting the control module to the spray gun is deliberately limited. Specifically, the larger the cross section of this cable, the stiffer it is and the more it will impede the operator. Moreover, the cables make the spray gun heavier.

The present invention also relates to sprayers which are generally found mounted on the end of an arm of a multi-axis machine. These sprayers comprise among other things a turbine rotating at high speed or a flow meter and a paint flow rate regulator. The document FR-2 762 237 describes such a sprayer.

The speed of rotation of the turbine of the sprayer must be accurately controlled. To do this, this speed is firstly measured and then transferred via a cable to a regulating card which compares it with a preset speed, calculates the discrepancy between the preset and the measurement and deduces therefrom a command to be sent to an actuator acting on the speed of the turbine. This actuator is generally a proportional valve located in the rack of the multi-axis machine.

Likewise, the flow rate must be controlled accurately. For this purpose, a flow meter measures the instantaneous value of the flow rate, this value being transferred via a cable to a regulating card. This value is compared with the flow rate preset. The discrepancy between these two values is used to deduce a correction command which must be sent to the actuator in this instance a proportional valve whose pressure outlet acts on a flow rate regulator.

SUMMARY OF THE INVENTION

In all cases, the cable connecting the sprayer to its control facility must be as small and as pliable as possible. To limit the size of this cable, the sprayer operating information is limited to its strict minimum. The reason for this is that these cables are subjected to very high tortional stresses in all directions since the machine exhibits a large number of degrees of freedom. It is necessary to be able to guarantee good transmission of information and hence good integrity of the cables since the time required to replace a cable in a sleeve is incompatible with the availability demands conventionally demanded by the users of sprayers.

An aim of the present invention is therefore to provide a spraying device in which the link between the sprayer and its control means exhibits high pliability and high reliability. This device will preferably make it possible to exchange a large amount of information and to transmit several commands of a different kind.

For this purpose, the device which it proposes is a spraying device comprising a first assembly fitted with a spray nozzle and a second assembly incorporating control means for the first assembly.

According to the invention, the first assembly is connected to the second assembly by a wireless communication system allowing an exchange of information.

In this way, it is possible to limit the pipes and cables linked to the first assembly comprising a sprayer to a pipe for supplying the product to be sprayed and an electrical power supply cable. This provides high pliability at the sprayer level as compared with the sprayers of the known prior art.

Moreover, the currently existing wireless communication systems are reliable and of high performance. It is for example possible to use an infrared or possibly an ultrasound system. However, in a preferred embodiment, the link established between the first assembly and the second assembly is a radio link. Given the relatively small distances separating the various elements constituting the spraying device, the link is for example effected by frequency modulation.

In a preferred variant, the first assembly comprises means allowing the coding/decoding of information received from sensors and/or of values of adjustments as well as a radio transmitter/receiver and the second assembly comprises a corresponding transmitter/receiver associated with coding/decoding means.

The spraying device is for example of the type in which a high voltage is generated in the first assembly by a cascade comprising a current multiplier and a transformer. In order to further reduce the number of wires connected to the first assembly, part of the supply to the current multiplier device is advantageously diverted to obtain a low DC voltage. The latter is then used to recharge a small battery included in the first assembly and used to operate the electronics of this assembly in the absence of the engaging of the high voltage.

Generally, air is used to shape the jets of product to be sprayed exiting via the spray nozzle of the first assembly. An advantageous embodiment then makes provision for an alternator driven by an air turbine to be mounted in the first assembly, the air turbine being driven by the air used to shape the jet exiting the spray nozzle.

The first assembly of the spraying device is for example a hand-held powder-coating spray gun. In this case, this spray gun is advantageously equipped with a control allowing it to be turned on and off and with at least two adjusting devices each making it possible to adjust an operating parameter of the spraying device and means are provided for sending the adjustments carried out on the first assembly to the second assembly.

In this way, the operator is not forced with each change of parameter to leave the booth in which he is located in order to go to the control module of the device and perform the necessary adjustments. This allows better ergonomics and also allows greater flexibility. Specifically, since the operator is no longer forced to leave the booth when articles of different types arrive, the type of article to be painted can be varied more often.

In one embodiment, at least one adjustment device comprises an adjustable potentiometer and the adjustment value of this potentiometer is transmitted to the second assembly by the wireless communication system.

To allow better reproducibility of the spraying parameters, each adjusting device is preferably controlled by a facility such as a button or slider, which does not return to a predetermined position when no action is exerted on it. Thus, if no action is exerted on the adjusting facility, the parameters will remain unchanged for two articles to be painted which follow one another.

The control allowing the first assembly to be turned on comprises for example a trigger. The latter is for example restored to a rest position by a spring when no action is exerted on the trigger.

In another case, the first assembly of the spraying device is for example a sprayer carried by an arm of a machine. This sprayer is generally of the type comprising a turbine which can rotate at high speed and drive a spraying facility called a cup. An actuator, for example a proportional valve, located in a rack of the machine acts on the supply to the turbine so as to modify its speed. Advantageously, a computer receiving from a sensor the measurement of the speed of the sprayer, or of the turbine, and also the speed preset, is incorporated into the sprayer. Furthermore, the actuator is preferably equipped with a receiver making it possible to receive a command message transmitted by the computer by way of the wireless communications system.

BRIEF DESCRIPTION OF THE DRAWINGS

Anyhow, the invention will be understood with the aid of the description which follows, with reference to the appended diagrammatic drawing, representing by way of nonlimiting examples two embodiments of a device according to the invention.

DETAILED DESCRIPTION OF THE INVENTION

Figure 1:
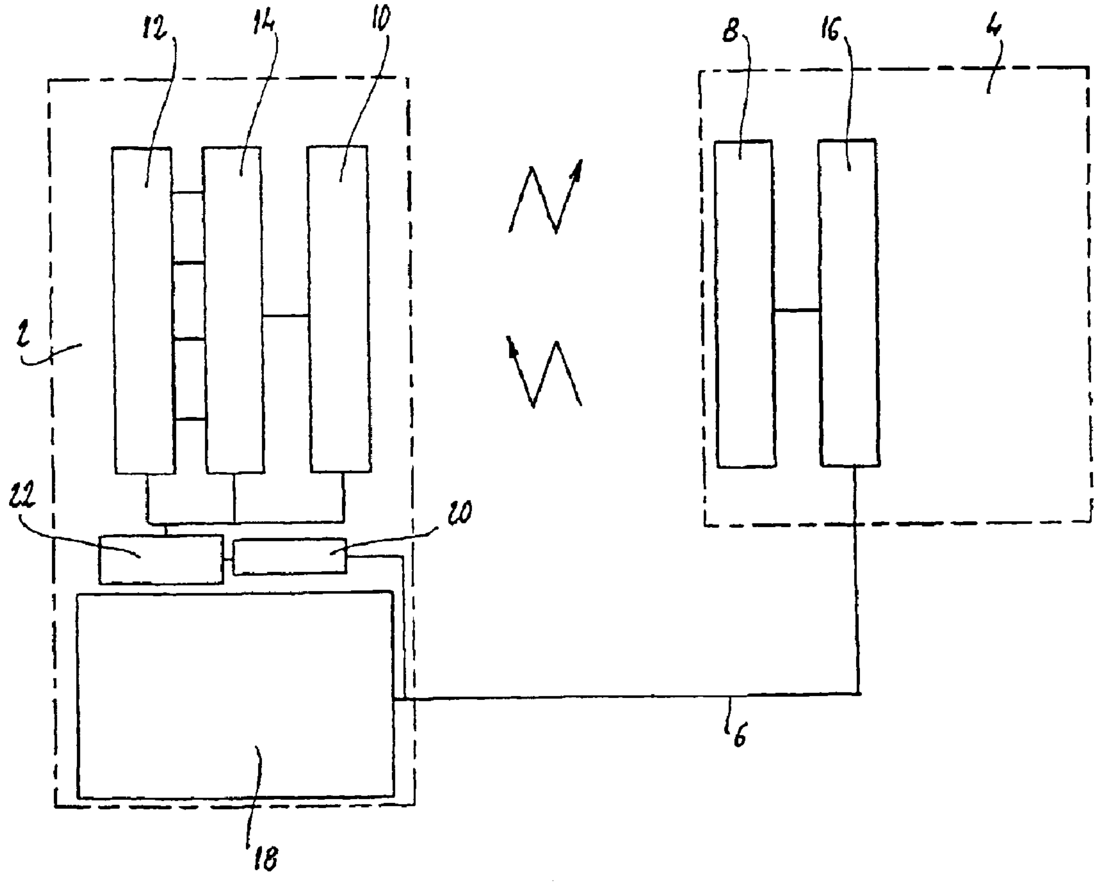
FIG. 1 diagrammatically shows a spraying device according to the invention.

In FIG. 1, a sprayer, taking the form for example of a spray gun, is shown diagrammatically by a chain-dashed outline 2. This sprayer is connected to a control module 4 by an assembly 6 formed of a cable and of a pipe. The control module is shown diagrammatically by a second chain-dashed outline.

The present spraying device serves for example for painting articles filing along in a painting booth. The spray gun is located inside the booth while the control module 4 is located outside it. The assembly 6 connects the sprayer 2 to the control module 4 through the wall of the booth.

The sprayer 2 is for example a hand-held powder-coating spray gun. On such a spray gun 2, there is a need to alter the flow rate of powder and to alter the voltage/current characteristic (U, I) required to carry out the powder-coating. The spray gun comprises a spray nozzle which is supplied with current at high voltage.

To perform the necessary adjustments, the spray gun is fitted with a button for continuous adjustment, associated with a potentiometer, for altering the flow rate of powder. A second adjusting button allows the selecting of a voltage characteristic (U) according to the article to be painted. This second button, also associated with a potentiometer, is for example a notch-wise adjusting button. It comprises for example four positions. A first position corresponds to a high voltage and to a high current which are necessary for painting a large flat article. A second position corresponds for example to a high voltage and to a low current, and is recommended for touching up an already painted article. A third position may correspond to a low voltage and a large current for painting for example a deep cavity. The fourth position available on the notchwise adjusting button may be used by the user to program at his discretion an adjustment which he has made. When the position of the adjusting button is intermediate between two notches, it is possible for example to envisage that, if the potentiometer delivers a voltage of between 0 and 10 V, for a delivered voltage of less than 2.5 V the adjustment corresponding to the first notch is selected, for a voltage of between 2.5 and 5 V the adjustment corresponding to the second notch is selected, for a voltage of between 5 and 7.5 V the adjustment corresponding to the third notch is selected, while for a voltage greater than 7.5 V, the adjustment corresponding to the fourth notch is selected.

In addition to the link via the assembly 6 formed of a cable supplying electrical power to the spray gun 2 and of a pipe for feeding powder to the sprayer, a radio communications system is envisaged between the spray gun 2 and the control module 4.

The control module 4 then comprises a transmitter/receiver 8 while the sprayer 2 comprises a corresponding transmitter/receiver 10. These transmitters/receivers 8, 10 operate for example by frequency modulation.

In addition to the adjusting buttons alluded to above, the spray gun 2 also comprises a certain number of sensors making it possible to ascertain a certain amount of information so as to send it to the control module 4. This of adjusting buttons and sensors is represented diagrammatically in the figure by a rectangle 12. The information gathered by the sensors and adjusting buttons is coded by a coding device 14 before being sent to the radio transmitter/receiver 10.

By virtue of its transmitter/receiver 10, the sprayer 2 can send its control module 4 a frame containing the state of the measurements and adjustment of the spray gun. The receiver part of this transmitter/receiver 10 is used to receive instructions from the control module, in particular the instruction to dispatch the aforesaid frame.

Correspondingly, the receiver part of the control module 4 is used to pick up the information sent by the sprayer 2. The transmitting part of this transmitter/receiver assembly 8 allows the sprayer 2 to be sent orders such as a request for information regarding this or that parameter. A coding device 16 for coding the radio waves to be transmitted by the transmitter/receiver assembly 8 is located in the control module. The spray gun 2 also comprises a cascade 18. This cascade is composed of a current multiplier and a transformer. It makes it possible to obtain a high voltage DC current from an AC current provided by the control module 4. Such a cascade is known to the person skilled in the art.

In a novel manner, part of the AC current provided by the control module 4 to the spray gun 2 is diverted upstream of the cascade 18 and steered towards a converter 20 which delivers a DC voltage of for example 6 volts. This DC voltage serves to recharge a battery 22 incorporated into the spray gun 2 so that the electronic components of this spray gun can operate in the absence of the engaging of the high voltage. To save energy, a circuit automatically toggles the electronics of the spray gun into standby mode, and hence minimizes the current consumed by this electronics automatically when the spray gun is no longer used.

In addition to the adjusting buttons, a trigger (not shown) is provided on the spray gun for turning the latter on and off. A spring is provided on this trigger for bringing it into the position corresponding to the turning off of the spray gun when no action is exerted on the trigger. The aforesaid circuit for placing the electronics on standby may be provided with a timer so that this electronics is placed on standby only after a predetermined time of nonaction on the trigger.

The manner of operation of the spraying device is as follows. Once the control module 4 and the sprayer 2 have been "tuned", the module 4 periodically dispatches a request to the sprayer 2 to ascertain the state of its various characteristics. On receipt of the request, the sprayer 2 transmits a frame comprising all the information requested by the control module 4. This information is for example the temperature of the voltage multiplier located inside the cascade 18, the level of the high voltage at the nozzle of the spray gun, the operating state of the cascade, the relative humidity, etc. This coded information is dispatched by the transmitter/receiver 10 to the control module 4 which decodes the frame which it receives so as to be able to process the information received. For greater security, the control module 4 can recode the information received and transmit this new frame to the sprayer 2 which thus verifies the equality of the two frames. If a difference is noted by the sprayer, an error message is then sent to the control module.

The sprayer 2 continuously reads the adjustments which the operator performs on the two adjusting buttons. As soon as one of these adjustments is modified, the electronics integrated into the spray gun 2 detects the variation of adjustment, codes it by means of the coding device 14 and dispatches a frame corresponding to this new adjustment to the control module 4.

The provision of several adjusting buttons on the spray gun 2 very substantially increases the ergonomics of the spraying device. Thus, the operator is no longer forced to leave his booth to change the adjustments and spraying parameters. When the series of articles to be painted changes, the operator can perform new adjustments corresponding to the new series of articles by simply acting on the buttons at his disposal on the spray gun. Hence, greater flexibility can be obtained. Specifically, if the operator is no longer forced to leave his booth each time to change the parameters and adjustments of the spraying device, changes of articles can be more frequent.

Furthermore, the spraying device according to the invention makes it possible to obtain better reproducibility of the painting parameters relative to the devices of the prior art. Specifically, when the flow rate of paint is adjusted by a trigger worked by the operator, it is very difficult for the operator to reproduce the same flow rate of paint for two successive articles unless the maximum flow rate is required for both these articles.

Another advantage of the device described above is that it makes it possible to minimize the size of the assembly 6 composed of the paint supply pipe and of an electric cable. This assembly 6 can thus remain relatively flexible and the operator can therefore paint the articles without being overly impeded by this assembly 6.

Another application of the invention makes it possible to effect a change of color directly from the spray gun. Specifically, when the operator has finished a series of articles of a certain shade, he has to undertake a so-called change of shade operation. This operation is generally carried out by an automatic programmed process but the operator is still responsible for selecting the new shade and for initiating the cycle which comprises in particular operations of draining followed by cleaning and finally filling the coating product supply pipe and the spray gun. By virtue of the invention, the operator can select the shade and initiate the cycle directly on the spray gun while remaining in the booth.

Another advantageous variant of the invention is to provide the power supply to the coding/decoding means and to the transmitter/receiver from a small alternator installed on the spray gun and to drive this alternator with an air turbine by using the air streams serving for the shaping of the jets. Regulation of the high voltage is then also incorporated into the sprayer. Thus, the electric cable connecting the sprayer to its control facility is dispensed with entirely.

If the hand-held powder-coating spray gun described above is replaced with a fixed sprayer at the end of an arm of a multi-axis machine, the diagram of FIG. 1 still remains valid.

Thus, it still has a sprayer 2 shown diagrammatically by a chain-dashed outline 2. This sprayer is connected to a control module 4 by an assembly 6 formed of a cable and of a pipe. The control module 4 is shown diagrammatically by the second chain-dashed outline. Here, the sprayer comprises a turbine rotating at high speed and driving a spraying facility called a cup. The document FR-2 762 237 reveals a sprayer of this type.

As before, the control module 4 comprises a transmitter/receiver 8 while the sprayer 2 comprises a corresponding transmitter/receiver 10, these two transmitters/receivers operating by frequency modulation. Sensors are incorporated into the sprayer 2. Here, no adjusting button is provided on the sprayer. The rectangle 12 thus diagrammatically represents the sensors. The information gathered by these sensors is coded by the coding device 14 before being sent to the radio transmitter/receiver 10. In the same way, a coding device 16 is found the control module.

The sprayer mounted at the end of the arm of the multi-axis machine also comprises a cascade 18 composed of a current multiplier and a transformer.

Just as for the hand-held powder-coating spray gun, provision may be made to divert part of the AC current provided by the control module upstream of the cascade 18 so as to steer it towards a converter 20 and to recharge a battery 22.

The regulating of the speed of rotation of the spraying facility is carried out with the aid of a proportional valve located in the rack of the machine. The speed of rotation of the turbine associated with this spraying facility must be accurately controlled. To do this, it is measured by a sensor and the information gathered is transferred to a regulating card, or computer, which compares the measured speed with a preset speed and dispatches an instruction to the proportional valve accordingly.

By virtue of the wireless communication system, the computer can be incorporated into the sprayer. The preset value is sent by radio from the control module 4 to the computer and the information concerning the measured speed is sent directly to the computer. The latter then dispatches instructions to the proportional valve by way of the transmitter/receiver 10. Advantageously, this valve is fitted with a receiver for receiving the information directly. However, it is also possible to envisage firstly sending the information to the control module 4, then sending this information by wire, or any other means, to the proportional valve.

By virtue of the wireless communication system, it is thus possible to ensure at the level of the sprayer 2, feedback control of the speed of the turbine, feedback control of the high voltage regulation, feedback control of the flow rate of product to be sprayed, etc. It is also possible to send the control module for a large amount of information (temperature of the voltage multiplier, high-voltage level, operating state of the cascade, relative humidity, etc) to the control module. The latter can then perform better regulation of the operating parameters.

As emerges from the above description, the spraying devices described above allow a better exchange of information and of instructions between the control module and the sprayer or spray gun while also offering high reliability without restricting the handleability of the sprayer or of the spray gun.

The wireless communication system makes it possible to improve the ergonomics of a hand-held powder-coating spray gun since it enables the operator using this spray gun to communicate with the control module without having to leave the booth in which he is located in order to perform the adjustments on the control module.

As is self-evident, the invention is not limited to the embodiments described above by way of non limiting examples; on the contrary it embraces all variants thereof within the scope of the claims hereinbelow.

Thus, for example, the radio link between the control module and the sprayer and the power supply cable of the sprayer could be replaced with an infrared or ultrasound system which does or does not permit an exchange of information in both directions.

Two separate adjustments have been envisaged on the hand-held powder-coating spray gun. Of course, a larger number of adjustments could be provided. Likewise, instead of adjusting buttons it is possible to use sliders or any other similar control means.

Figure 2:
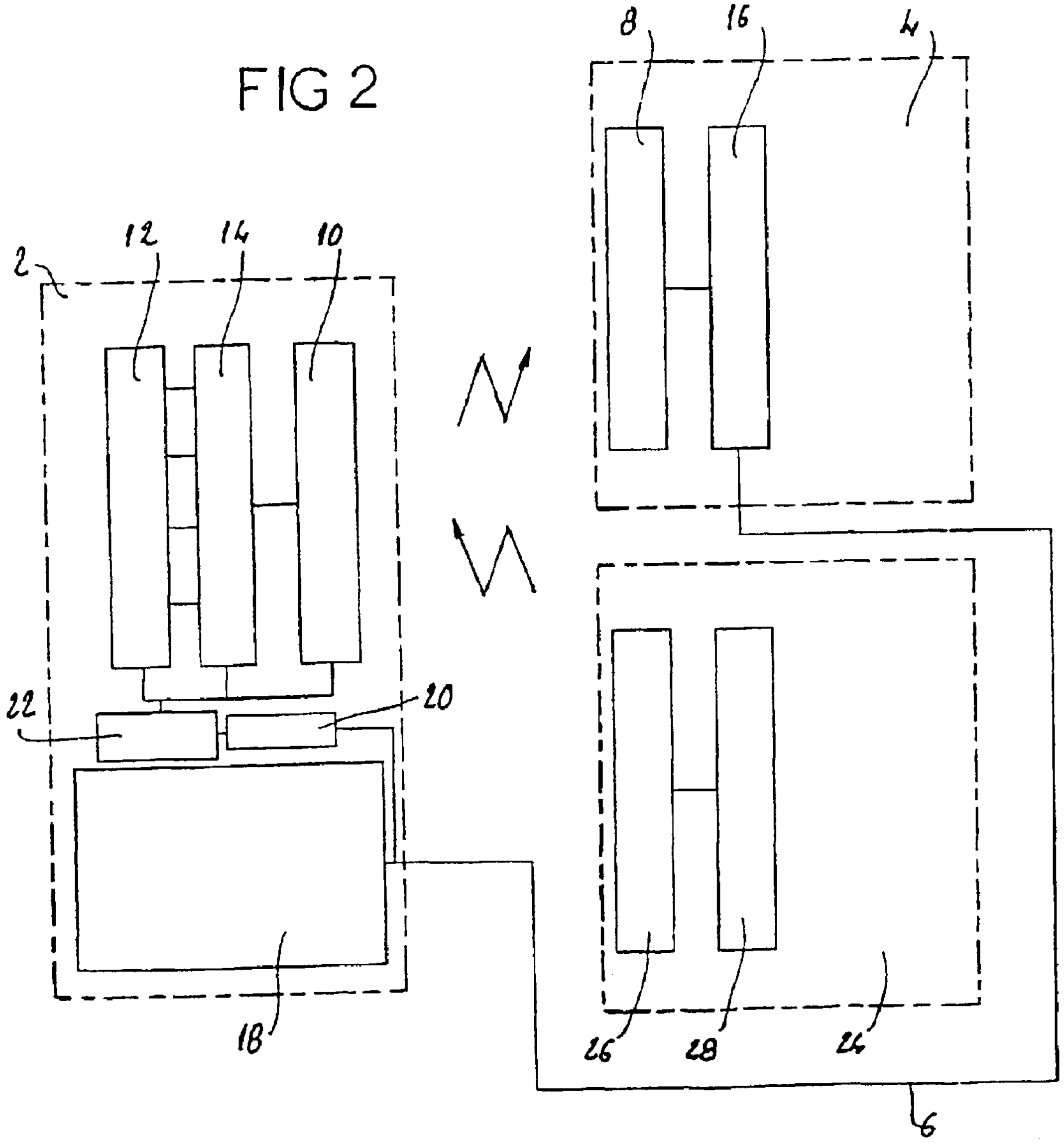
FIG. 2 shows a variant of FIG. 1 in which a computer is integrated into the spraying device.

FIG. 2 relates to a form of execution which can also be applied to a hand-held sprayer just as to a sprayer carried by a multi-axis machine.

In this figure, a computer is integrated into the first assembly 2. This computer receives the information from the sensors 12 and may possibly code it so as to send it using the transmitter/receiver 10. This computer also receives the preset values of the various parameters which are dispatched to it by the control module 4. It can thus, for each of the parameters, on the basis of the discrepancy between the measurement and the preset, calculate the command to be applied to each of the actuators corresponding to the regulating of the parameters. This command is coded by the computer and then transmitted by the antenna 10. Either the module 4 receives the command via its reception antenna 8, decodes it and dispatches it via a cable to the corresponding actuator, or the actuator 24 is itself equipped with a transmission/reception antenna 26 and with a coding/decoding system 28 and it receives the control directly. This second possibility further reduces the number of cables required for the operation of the rig.

What is claimed is:

1. A spraying device comprising:

a spray gun:

a transmitter/receiver disposed in the spray gun; and control means for the spray gun, wherein the spray gun is connected to the control means by a wireless communication system allowing an exchange of information.

2. The spraying device as claimed in claim 1, wherein the wireless communication system comprises a radio link established between the spray gun and the control means.

3. The spraying device as claimed in claim 2, wherein the spray gun comprises first means for allowing a coding/decoding of information received from sensors and/or of values of adjustments and wherein the control means comprises a corresponding control transmitter/receiver associated with a second coding/decoding means.

4. The spraying device as claimed in claim 1, wherein a high voltage is generated in the spray gun by a cascade comprising a current multiplier and a transformer and part of the supply to the current multiplier device is diverted to obtain a low DC voltage.

5. The spraying device as claimed in claim 3, wherein an alternator driven by an air turbine is mounted in the spray gun allowing an energizing of the first coding/decoding means and of the first transmitter/receiver, the air turbine being driven by air used to shape a jet of product to be sprayed exiting the spray nozzle.

6. The spraying device as claimed in claim 3, wherein the first coding/decoding means comprise a computer able to deduce directly commands resulting from the information originating from the sensors and commands being coded and sent by the first transmitter/receiver to the controls means.

7. The spraying device as claimed in claim 6, wherein the control means controls at least one actuator on the basis of the commands received.

8. The spraying device as claimed in claim 7, wherein the actuator is equipped with third means of transmission/reception and with third means of coding/decoding and receive directly the commands transmitted by the spray gun.

9. A spraying device comprising:

a first assembly including a spray nozzle; and a second assembly including control means for the first assembly;

wherein the first assembly is connected to the second assembly by a wireless communication system allowing an exchange of information;

wherein the wireless communication system comprises a radio link established between the first assembly and the second assembly;

wherein the first assembly comprises first means for allowing a coding/decoding of information received from sensors and/or of values of adjustments and a first radio transmitter/receiver and wherein the second assembly comprises a corresponding second transmitter/receiver associated with a second coding/decoding means;

wherein the first coding/decoding means comprise a computer able to deduce directly commands resulting from the information originating from the sensors and commands being coded and sent by the first transmitter/receiver to the second assembly; wherein the second assembly controls at least one actuator on the basis of the commands received; and wherein the actuator is equipped with third means of transmission/reception and with third means of coding/decoding and receive directly the commands transmitted by the first assembly.

* * * * *